N. C. BRIGGS.
DIRECTION INDICATOR FOR MOTOR VEHICLES.
APPLICATION FILED JUNE 17, 1918.
1,329,750.
Patented Feb. 3, 1920.
2 SHEETS—SHEET 1.
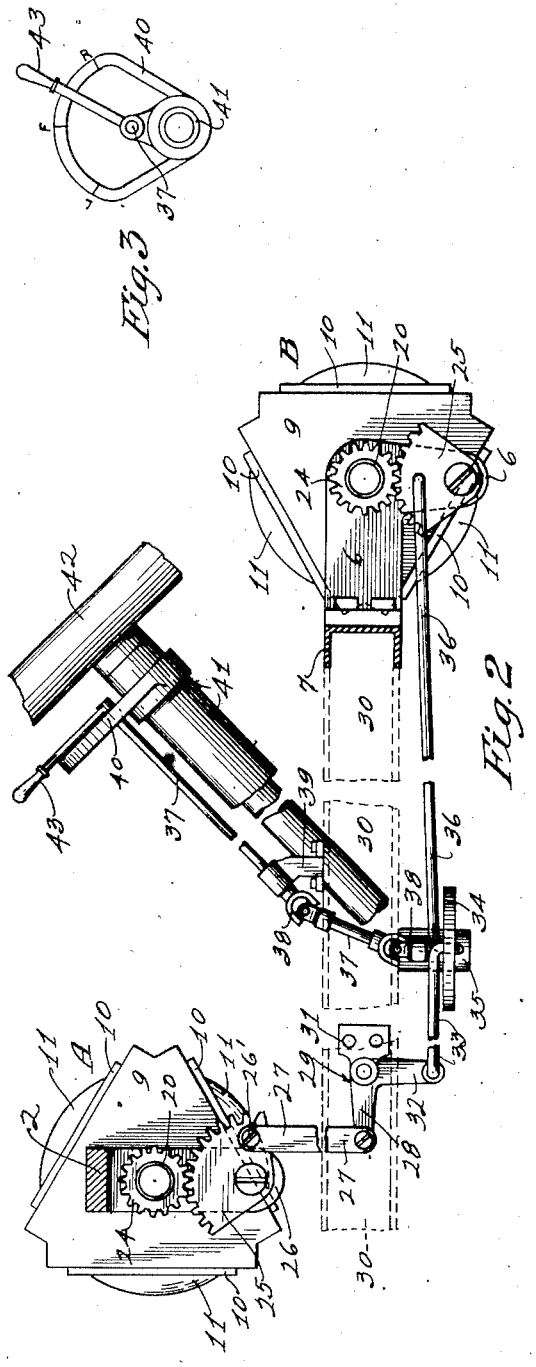
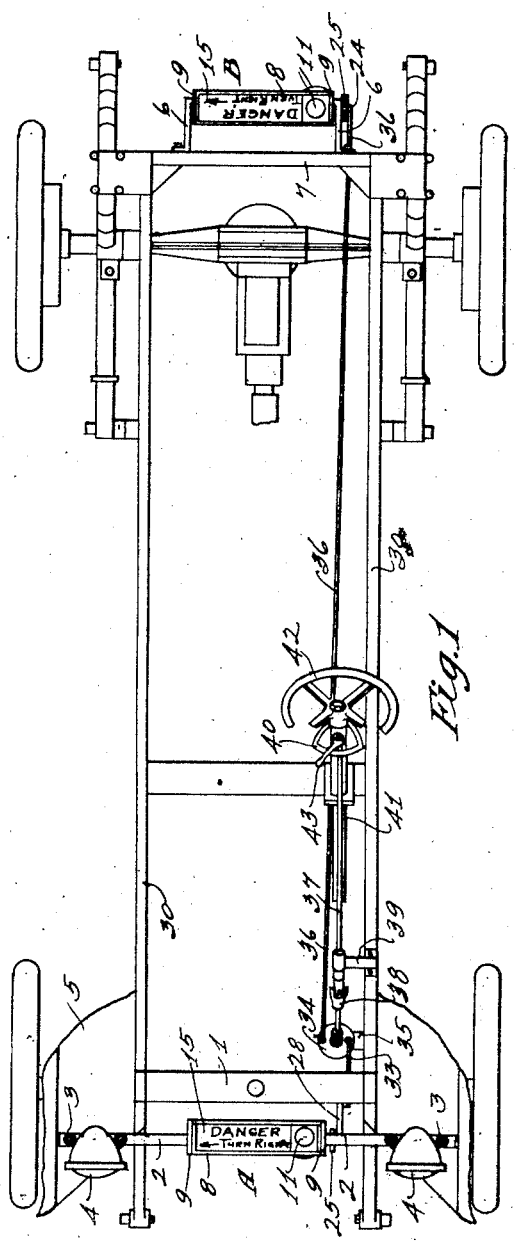
INVENTOR.
Nathaniel C. Briggs
BY
Mack & Litzenberg
ATTORNEY.

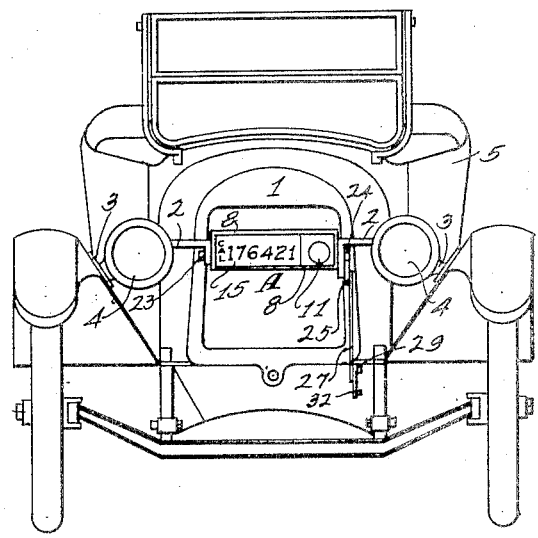
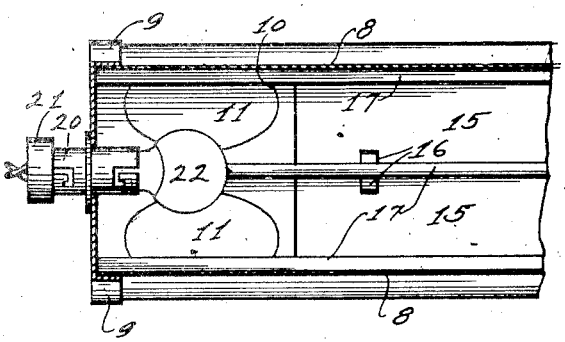
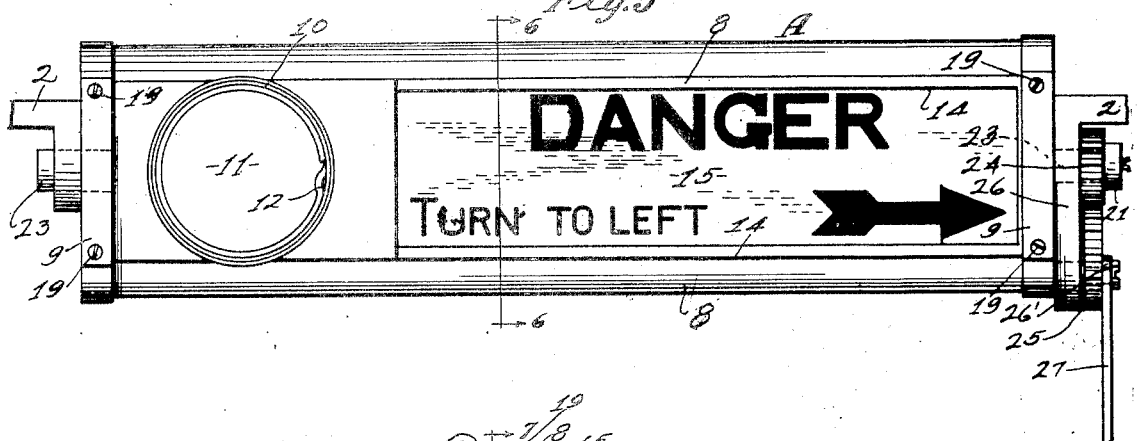
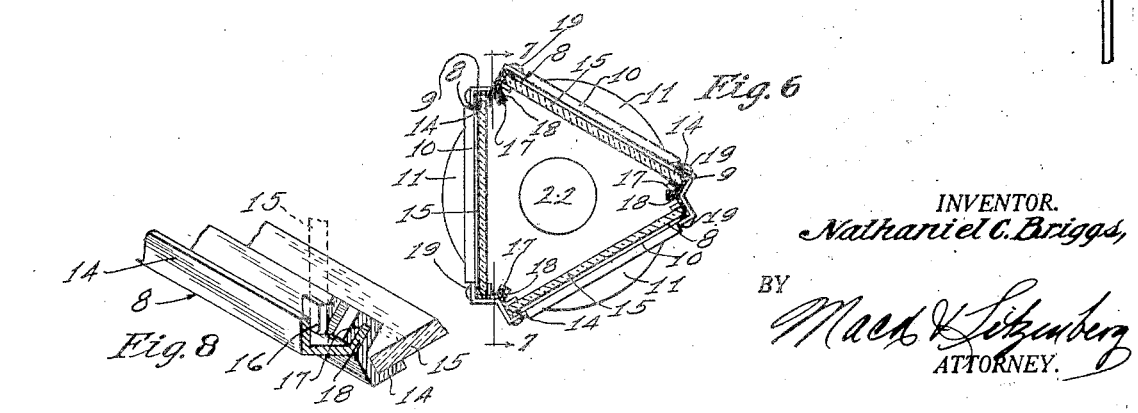

UNITED STATES PATENT OFFICE.

NATHANIEL C. BRIGGS, OF LOS ANGELES, CALIFORNIA.

DIRECTION-INDICATOR FOR MOTOR-VEHICLES.

1,329,750.      Specification of Letters Patent.      Patented Feb. 3, 1920.

Application filed June 17, 1918. Serial No. 240,550.

*To all whom it may concern:*

Be it known that I, NATHANIEL C. BRIGGS, a citizen of the United States, and a resident of Los Angeles, in the county of Los Angeles and State of California, have invented new and useful Improvements in Direction-Indicators for Motor-Vehicles, of which the following is a specification.

My invention relates to means applicable to motor vehicles of both the pleasure and freight types by means of which an intended change of direction of a vehicle may be indicated to drivers of the vehicles following, in order that accidents may be avoided and the traffic regulations of large cities strictly complied with.

The primary object of my invention is to provide a simple and economical device capable of being attached readily to the front and rear ends of motor vehicles and having common operating means located convenient to the driver's seat, preferably on or near the steering wheel.

A further object is to provide a combined illuminated direction indicator and number display device for the front and rear ends of the vehicle, and in addition, a red, or danger light arranged so as to be visible while the number of the license is being displayed or when the signals are being displayed, thus insuring a proper display of a danger signal at both ends of the vehicle at all times.

A further object is to provide a signal housing having separable sides mounted concentrically about a common axis, each of said sides having printed thereon a signal, or number, for indicating the direction of the vehicle. A preferred form of this housing, which I will describe in detail later on, embodies three sides arranged in the form of a triangle. One of the three sides is printed or painted "Danger—Turn to the right", while on another side is displayed a sign reading "Danger—Turn to the left", there being arrows on each of said sides pointing in opposite directions, and the third side has the license number of the vehicle displayed thereon. The signs are preferably formed on glass so that they may be properly illuminated at night and the glass being preferably white, so that dark letters may be prominently shown thereon in the day time.

Another object is to provide in said housing a single lamp connected with the lighting circuit of the vehicle for illuminating all of the signals simultaneously, together with means for turning the housing so that a selected signal may be displayed to persons in front of or behind the vehicle. Other objects may appear as the description progresses.

While the above objects may be carried out by means of somewhat different systems and arrangements of the several elements of such a device, I prefer to employ the elements arranged in the manner shown in the drawings hereto annexed, in which:

Figure 1 is a plan of a vehicle running gear with only such portions thereof shown as may be necessary to illustrate the manner of attaching my devices thereto;

Fig. 2 is an enlarged side elevation of my device and parts of the running gear;

Fig. 3 is a plan view of the signal operating sector and lever;

Fig. 4 is a front end elevation of a motor vehicle with my device attached thereto for operation;

Fig. 5 is an enlarged side elevation of one of the signal housings;

Fig. 6 is a transverse section of Fig. 5 on the line 6—6;

Fig. 7 is a fragmentary longitudinal section of the housing on the line 7—7 of Fig. 6;

Fig. 8 is a perspective view of a portion of the housing frame showing the manner of attaching the sides together.

In the drawings, similar characters of reference are employed for indicating the same and like parts throughout the several views.

The front signal housing A is mounted in front of the usual radiator 1, on brackets 2, 2, which are adapted to be attached to the usual yokes 3, 3, which support the lamps 4, 4, this housing extending transversely across the front end of the machine, as shown in Fig. 4.

The rear signal housing B is mounted at the rear of the body 5 on brackets 6, 6, attached to the rear transverse frame member 7, and, like housing A, also extends transversely of the body.

Each of the housings, which are in all respects similar, is of triangular cross section has three separable sides composed of skeleton frames 8, 8, 8, of metal of suitable thickness and strength, which are adapted to be removably attached together, and end closing members 9, 9. The left ends of all of the members 8 have circular flanged seats 10, 10, 10, formed thereon, as shown in Fig. 5, for receiving red glass bull's eye lenses 11, 11, 11, such as are commonly used for the tail lights of motor vehicles, these lenses being held in the seats in the usual manner by wires 12.

The outer edges of the members 8 are bent over as at 13 and 14, and strips of white or suitable colored glass 15, 15, are held against these edges by means of a plurality of lips 16 formed out of the metal of the sides, as shown in Fig. 8. Thus an elongated opening is provided in each of the sides of the housings which extends from the right hand end and in each case to a point near the red lenses 11. One of the inner portions or edges 17 of each of the sides 8 is bent inwardly at an angle of 30 degrees from the edges 13 and 14, and thence at right angles and finally at right angles again so as to form a channel, as shown in Fig. 8, to receive an edge 18 of the adjacent side, which edge is bent as shown at an angle of 30 degrees and is adapted to slide in the channel of the portion 17. Thus the sides of the housing may be attached together by sliding the portions 18 in the channels of the portions 17, until their ends are flush, whereupon the end members 9 may be forced over the ends of the sides and held thereon by means of screws 19. The above described construction is preferable to an integral housing for the reason that when a glass is broken or in the event of the necessity for obtaining access to the interior of the housing, such access may be held by removing one of the end members, and a glass may be replaced through the opening thus provided in the end of the housing.

One of the end members 9 has a tubular socket 20 soldered or otherwise suitably attached thereto, which extends outwardly from the housing and also substantially inward thereof, an electric plug 21 being attached to the outer end of the socket and a light bulb 22 being held in the inner end thereof.

One of the brackets 2, 2, of the front housing is bored to fit the periphery of the socket 20, this socket being centrally positioned relative to the three sides of the housing, so that the socket constitutes a pivot on which the housing may be turned. The opposite end of this housing has a pin 23, which is alined with the socket 20 and forms a pivot for this end of the housing, the other bracket 2 being bored to receive the pin. At this end of the housing, however, I provide a pinion 24, which is attached to the extended end of the pin 23, and a sector 25 which is pivotally mounted on an extension 26 of bracket 2 and meshes with said pinion. When housing A is in normal position with the number of the license showing in front, the sector 25 will be positioned about centrally with the pinion and on the horizontal center line thereof. I attach by means of a screw 26' a link or bar 27, which is in turn connected at its lower end with a horizontal arm 28 of a bell crank 29. This bell crank is suitably attached to the frame 30 of the vehicle by means of a bracket 31 and an arm 32 of the bell crank 29 is connected by means of a rod 33 with a disk 34, said disk being pivotally supported on the frame 30 by means of a bracket 35.

Now, the rear housing B is also provided with one of the pinions 24 and a sector 25 meshing therewith and a rod 36 connects the sector of housing B with the disk 34, as shown in Fig. 1, the housings A and B being connected as shown with opposite portions of the disk, so that when the disk is turned the housings may be turned in the proper relative directions so as to display the same signals at both ends of the vehicles. The disk 34 is turned by means of a sectional shaft 37 having universal joints 38 inserted between the sections, the lower section of the shaft being secured to the disk and the upper section being pivotally supported at the lower end in a bearing 39 attached to the frame 30, while the upper end thereof is supported in a sector 40, which is attached to the steering column 41. The shaft 37 follows the inclination of the steering column 41, and the universal joints accommodate the shaft to the inclination thereof. The sector 40 is adapted to be placed for the best results as close to the steering wheel 42 as possible so that the shaft 37 may be turned by turning the lever 43 on the upper end thereof when the steering wheel is turned for changing the direction of the vehicle, or before the vehicle is turned for the most satisfactory results.

The form of the housings is such that a turn of 120 degrees is necessary for changing the signs thereon, and the normal position of each housing being such that the side displaying the license number is disposed in a vertical plane, the other two sides occupy planes at angles of 60 degrees relative thereto. When the operating lever 43 is moved to the right, the disk 34 will be also moved to the right, the front housing A will be moved in a clockwise direction by means of the connections described, and the rear housing B will be moved in the opposite direction, when the connections are as shown. Thus the signs on the housings must be arranged so that such a movement will display the "Turn to the right" sign. An opposite movement of the lever 43 will move the housings so that the "Turn to the left" sign will be displayed. This, of course, occurs when the lever 43 is moved to its extremes of action, and when the lever is midway between the extremes of action, the license number will be displayed and the housings will thus be in normal position. The sectors 25 on the housings are preferably at least twice the radius of the pinions 24 so that one sixth of a turn of the lever 43 will effect a one-third turn of the pinions and housings, otherwise difficulty might be encountered in moving the housings over center.

What I claim is:

1. In a direction indicator, the combination with a vehicle running gear and steering mechanism therefor, of a housing supported at each end of said vehicle, a supporting bracket for each housing, a gear on each housing, a sector supported on each of said brackets and meshing with said gears, a common operating disk supported on said running gear and operably connected with said steering mechanism and for operation therewith, and independent connections between said operating member and said sectors, for simultaneously operating said housings, for displaying selected signals.

2. In a direction indicator, in combination with a vehicle running gear and steering mechanism therefor, of an indicator supported at each end of the vehicle, supports for said indicators, an operating disk common to and supported on said running gear frame between said indicators, gearing connected with said indicators, devices connecting said gearing with said operating disk, and a main operating member supported on said steering mechanism and connected with and for oscillating said disk, whereby said indicator may be simultaneously operated for displaying line signals.

Signed at Los Angeles, in the county of Los Angeles and State of California, this 5th day of June, 1918.

NATHANIEL C. BRIGGS.

In presence of—
LUTHER L. MACK,
H. M. BRUNDAGE.